United States Patent Office 2,693,403
Patented Nov. 2, 1954

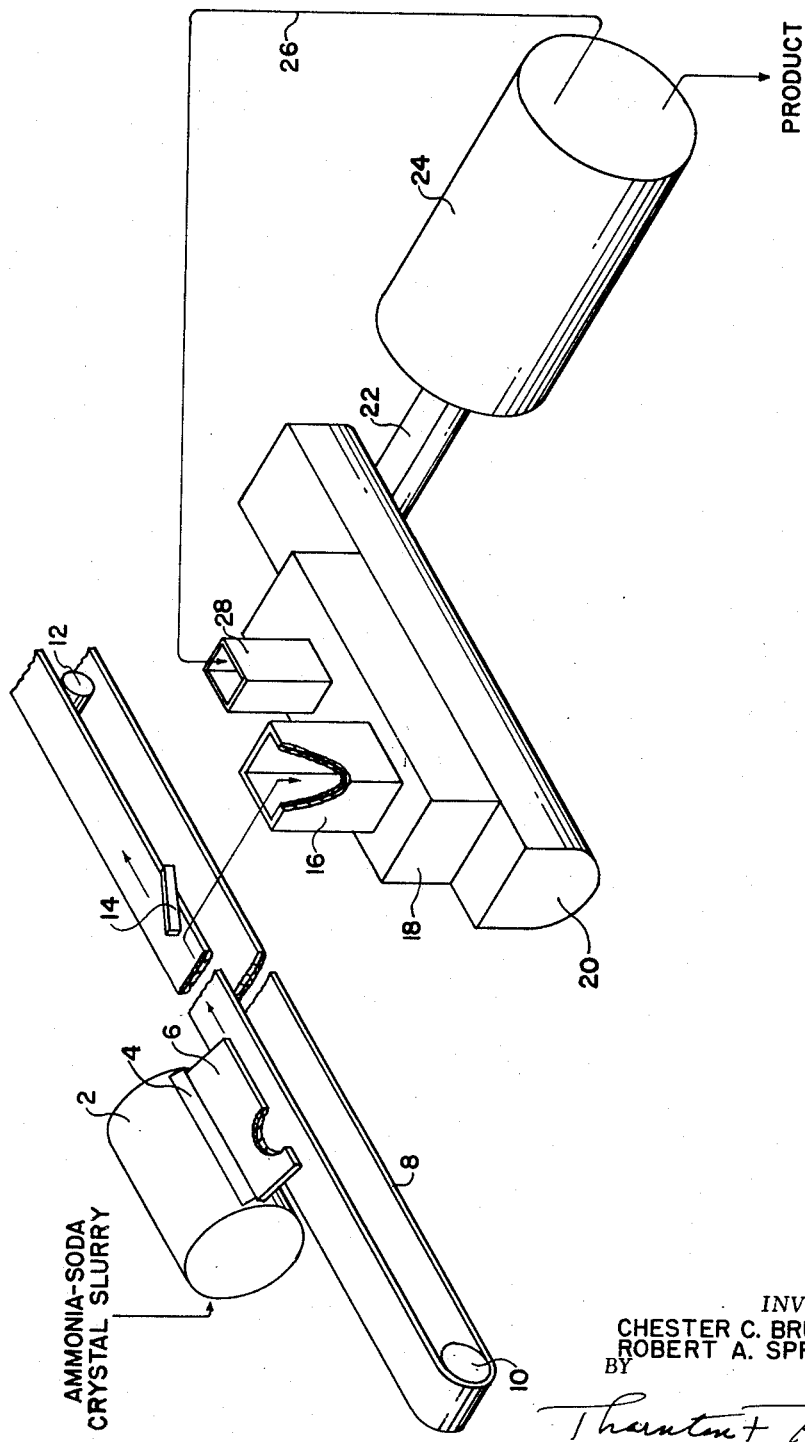
Nov. 2, 1954   C. C. BRUMBAUGH ET AL   2,693,403
TRANSPORTATION OF WET AMMONIA-SODA CRYSTALS
Filed Jan. 26, 1952
INVENTORS
CHESTER C. BRUMBAUGH
ROBERT A. SPRINGER
BY
Thornton + Holder

2,693,403

TRANSPORTATION OF WET AMMONIA-SODA CRYSTALS

Chester C. Brumbaugh, Painesville, and Robert A. Springer, Madison, Ohio, assignors to Diamond Alkali Company, Cleveland, Ohio, a corporation of Delaware Application January 26, 1952, Serial No. 268,453

7 Claims. (Cl. 23—65)

This invention relates to improvements in the ammonia-soda process for the manufacture of sodium carbonate, and more particularly relates to improvements in the method of conveying and transporting crude, wet, coherent masses of crystalline sodium bicarbonate, by which method the flow of said crystals to a heated zone for their decomposition to sodium carbonate, carbon dioxide, and water is maintained substantially constant, and by which the production of carbon dioxide in said zone and the consequent production of sodium carbonate in said zone is maintained at a relatively high constant value.

In the manufacture of sodium carbonate by the ammonia-soda process, a sodium chloride brine is saturated with carbon dioxide and ammonia, whereby ammonium carbonate and bicarbonate form in the brine and react with the sodium chloride therein to form sodium bicarbonate, which sodium bicarbonate precipitates in the form of fine, needle-like crystals. The sodium bicarbonate crystals thus formed, designated "ammonia-soda" in the industry, are separated from the mother liquor continuously by means of suitable separatory devices, such as rotary filter drums or "filter wheels," or by means of continuous or batch centrifuges.

The wet coherent masses of ammonia-soda crystals associated with the mother liquor of the treated brine normally contain from 14%–28% moisture, and a few per cent each of ammonium bicarbonate, ammonium chloride, sodium chloride, and sodium carbonate. The crude crystals are transferred from the separatory device to a transporting means, such as an endless belt conveyor, from which endless belt the crystals are fed continuously to the so-called "driers." In the driers, the wet crystals are freed of grossly-held water and are subjected to decomposition by heating, whereupon the ammonium carbonate and bicarbonate present are decomposed to ammonia, carbon dioxide, and water, and the sodium bicarbonate is decomposed to carbon dioxide, water, and sodium carbonate. The sodium carbonate, of course, is the end product of the process. The carbon dioxide, however, is equally important, since upon a regular, dependable supply of a relatively highly concentrated carbon dioxide gas stream issuing from the driers to be fed to carbonating towers for the carbonation of further ammoniated brine, depends the efficient, regular, and economic operation of the entire ammonia-soda process.

The transporting of the wet ammonia-soda crystals from the filter means to the driers has remainded until now, and despite many years of operating the ammonia-soda process, the most troublesome operation in the entire process. The wet coherent masses of ammonia-soda crystals tend to adhere tenaciously to all materials of construction heretofore used with which they come in contact in the course of their transportation and storage. For example, the wet crystals tend to adhere tenaciously to the exposed metal and textile surfaces with which they come in contact on a filter wheel, the metal and natural rubber surfaces of the means used to convey the wet crystals from the filter or centrifuge to the drier, as well as the metal feeder chutes, feed tables, feeder valve mechanism, and other exposed metal surfaces positioned at the feed end of the drier itself. This behavior of the wet ammonia-soda crystals results in losses of sodium bicarbonate in the course of their transportation, which losses are generally mechanically not compensable.

However, the most troublesome characterstic of the wet ammonia-soda crystals which is to "hang up" in the feeder chutes and the feeder valve mechanism at the feed end of the drier, for all that it causes erratic production of sodium carbonate and carbon dioxide in the drier, and thus, as the sequel will show, deleteriously modifies the entire ammonia-soda process both with respect to quantity of soda ash produced and quality thereof, has up to the present time never been successfully removed. For example, it is not uncommon, in the course of feeding the wet ammonia-soda crystals to the drier, to have the crystals "hang up" in the drier chutes to the extent that the chute, normally about 1 foot square in cross section, is filled to a depth of about 4 feet with a solid mass of the crystals which is not dislodged by the action of gravity upon the mass but must be dislodged by hand, as by means of a rod or tamper, to force the crystals from the chute. Moreover, such clogging of the feeder chute and feed mechanism leading to the drier is not an occasional happening but occurs as frequently as hourly in the normal course of a commercial operation. Even if the only difficulty involved were the increased labor cost alone, that would be sufficient to make this part of the process a major problem contributing to the cost of soda ash, which indeed it has been up to the present.

A difficulty of overriding significance, however, as will be appreciated by those skilled in the art, is that when erratic functioning of the drier chute and other transportation means for the transporting of the wet ammonia-soda crystals to the driers is experienced, an attendant erratic production of both the carbon dioxide and sodium carbonate is experienced. Under such conditions, there are large fluctuations in the amount, and thus the concentration, of carbon dioxide available to the carbonating towers wherein the ammonia-soda crystals are formed. Fluctuations in the amount or concentration of carbon dioxide in the gas stream fed to the carbonating towers, in turn, affects the rate of sodium bicarbonate crystal formation, as well as deleteriously modifying the form of the bicarbonate crystals, which in turn may cause malfunctioning of the filters or centrifuges used to remove the greater part of the mother liquor from the crystals and thereby adversely affect the rate of production of sodium carbonate in the driers. Thus, the effect of malfunctioning of the transportation means for the wet ammonia-soda crystals is cyclic and cumulative, in that if there are fluctuations in delivery to the driers, there are corresponding and uncontrollable fluctuations in each succeeding step, including the carbonation in which the sodium bicarbonate crystals are formed, whereby eventually the malfunctioning of the transportation means returns to haunt its source.

In addition to the above-described troublesome behavior of the wet ammonia-soda crystals, the extreme corrosiveness of the crystal masses particularly in contact with exposed metal surfaces is also a significant factor. Erosion of metal surfaces with which the crystals come into sliding contact, as well as those with which it may otherwise come in contact, presents a constant problem.

The above problem has for many years been a chronic one in the ammonia-soda process for the manufacture of sodium carbonate from sodium chloride brine, and up until the time the present invention came into being, has remained unsolved in the industry.

In the course of the investigations leading up to the solution of these problems by means of the present invention, it has been found that the wet coherent masses of the ammonia-soda crystals, as obtained in the ammonia-soda process, are very susceptible to electrostatic charges. However, it has also been found that the tendency of the masses of wet crystals to adhere to the surface of a given material is independent of the electrical conductivity of such material, but that it is dependent, at least in part, upon the character and arrangement of the atoms and groups of atoms in the molecules of the material under investigation, together with certain specific physical properties of the material. Thus, it has been found that substances whose atoms are arranged in a manner closely related to that of true crystallinity, for example, the metals, and materials, the atoms of which are arranged in giant, three-dimensional highly cross-linked molecules, such as ceramic materials, i. e., glass, porcelain, and the like, all exhibit a relatively high degree of affinity for the wet coherent masses of ammonia-soda crystals. To all of these materials, the electrical conductors and the electrical non-conductors alike, the wet crystalline masses adhere with sufficient tenacity to require considerable force to dislodge them. Thus, transporting means for the ammonia-soda crystals fashioned of these materials are found to be little or substantially no better than the conventional transporting means heretofore employed throughout the industry.

In contrast to the above, and as a result of these investigations, it has now been found that the wet coherent masses of ammonia-soda crystals exhibit little or no tendency to adhere to resinous organic materials which present to said crystals a surface characterized by:

(A) A molecular structure containing skeletal carbon atoms attached to non-metal substituent atoms, (B) A high dielectric constant, and (C) A low coefficient of sliding friction with respect to said crystals.

In accordance with the above description of the ammonia-soda process for the manufacture of sodium carbonate, including therein the transportation of wet coherent masses of crude sodium bicarbonate crystals, the present invention is directed to that improvement which consists in moving said crystals in contact with a membrane of a resinous organic material which presents to said crystals a surface characterized by:

(A) A molecular structure containing skeletal carbon atoms attached to non-metal substituent atoms, (B) A high dielectric constant, and (C) A low coefficient of sliding friction with respect to said crystals.

Examples of preferred resinous organic materials suitable for the purposes of the present invention are:

(A) Polymers and copolymers of ethylenically unsaturated monomers having the generic formula $H_2C=CHR$, wherein R represents a member of the group of H, Cl, phenyl, $-OOCCH_3$, $-CH=CH_2$, and $-CN$;

(B) Polymers and copolymers of the compounds $H_2C=CCl_2$ and $C_2Cl_nF_{4-n}$, wherein $n$ is a whole number 0 and 3, inclusive;

(C) Polymers and copolymers of ethylenically unsaturated monomers having the generic formula $$H_2C=CR'COOR''$$

wherein R' represents one of H, $-CH_3$, and $-C_2H_5$, and R'' is an aliphatic hydrocarbon radical having from 1 to 12 carbon atoms;

(D) Alkylene diamine condensates with aliphatic dibasic acids, such as a condensation product of hexamethylene diamine with adipic acid;

(E) Substances chosen from the group consisting of cellulose esters of lower aliphatic acids, i. e., cellulose acetate, cellulose acetate butyrate, or cellulose acetate propionate, polymers of unsaturated high molecular weight fatty acids and fatty acid esters, such as drying oils, chlorinated paraffin wax containing from 65% to 75% of chemically combined chlorine, and bitumen;

(F) Copolymers including at least 2 materials of (A), (B), and (C) above.

Referring now to the drawing attached hereto and forming a part hereof, which drawing is a diagrammatic showing of parts of the apparatus of a transportation system, for ammonia-soda crystals, commonly used in an industrial process for the manufacture of sodium carbonate, filter wheel 2 is associated with doctor blade 4, which removes ammonia-soda crystals therefrom. The crystals pass by means of slide 6 to conveyor belt 8, to which motion is imparted by driving pulley 10 and which is supported by suitable means, such as supporting pulley 12, which supports main belt 8 in suitable position with respect to plow 14, which removes the ammonia-soda crystals from the belt 8 and directs a stream of crystals to chute 16. Plow 14 is laterally adjustable to vary the amount of crystals removed from belt 8, in accordance with the desired level to be maintained in chute 16. After passing through chute 16, the crystals are introduced into metering means 18, which may take any suitable form as those skilled in the art will understand, the specific mechanism thereof forming no part of this invention. Metering means 18 control the throughput of the drier 24, wherein the crude crystals are decomposed to sodium carbonate, water, and carbon dioxide, together with lesser amounts of ammonia and ammonium chloride. From the metering means 18, the crystals are introduced into mixing means 20, the structure of which is similarly non-pertinent, wherein a portion of the dry sodium carbonate issuing from drier 24 by way of recycle line 26 and chute 28 is mixed with the wet ammonia-soda crystals in order to reduce the moisture content thereof and thereby prevent scaling at the point of introduction of the feed stream into drier 24. The mixture of ammonia-soda crystals and dry sodium carbonate is fed from mixing means 20 by way of conduit 22 to the drier 24. The mixture of wet ammonia-soda crystals and dry sodium carbonate fed through conduit 22 may suitably have a moisture content amounting to a fraction of that originally in the ammonia-soda crystals, for example, 4% to 8%.

It will be appreciated by those skilled in the art that in the practice of the method of the present invention, certain of the above-described preferred resinous materials lend themselves more readily to the coating of specific conventional materials of construction than do others, and when so used, are preferably employed in the form of films or thin sheets supported by the ordinary conventional materials of construction. Thus, for example, polyethylene, plasticized vinyl chloride, plasticized vinylidene chloride, vinyl acetate, and polystyrene are examples of materials which are sufficiently abrasion-resistant to be used as coating materials for metallic portions of production equipment over which the wet coherent masses of ammonia-soda crystals are moved during the course of their transportation. Moreover, polyethylene, suitably plasticized polyvinyl chloride, vinylidene chloride-vinyl chloride copolymers, acrylonitrile, butadiene copolymers, and butadiene-styrene copolymers may be employed in the form of endless belts, or as a coating for the portions thereof exposed to the wet coherent masses of ammonia-soda crystals, where such means are used for moving the crystals from the point in the process in which the crystals are separated from the mother liquor, to the drier for their decomposition. The polyfluoroethylene and polychlorofluoroethylene plastics are, because of their cost, suitably used in that portion of the process equipment where a plastic material is exposed to relatively high temperatures, for example, the polytetrafluoroethylene plastics may be employed as coating materials for the feed valve mechanism and mixer at the feed end of the drier.

The cellulose ester plastics noted above, the chlorinated paraffin wax, and the bitumen may suitably be employed as coating materials for conventional materials of construction in those portions of commercial equipment exposed to the wet ammonia-soda crystals where such coatings are subjected to relatively less abrasion by the wet crystal masses than those portions of the equipment over which the wet crystals ordinarily slide in the course of their transportation to the drier from the means used to separate them from the mother liquor.

More specifically, the portions of conventional equipment which are ordinarily constructed of metal, for example, centrifuge baskets, doctor blades of filter wheels, slides and chutes for transportation of the crystal masses from the filter wheel to an endless belt, as well as the plows, slides, and chutes for transporting the crystal masses from an endless belt to the drier, are suitably coated with, or used as supports for, the vinyl-type plastics in the method of the present invention. Moreover, filter cloths, chutes and slides may, if desired, be fabricated entirely of vinyl plastics, such as polyvinyl chloride, polyvinylidene chloride, and copolymers thereof, polytetrafluoroethylene, or polymethylmethacrylate. The advantage of these materials, in chutes and slides particularly, is that when such materials are employed supported on a metallic substrate, the application of the plastic material to the metallic substrate is readily effected by means of rivets of the same material. For example, polyethylene sheeting of the order of ¼ inch thickness is readily riveted to a steel substrate in a chute or slide by means of polyethylene rivets and likewise, the plasticized vinyl plastics, as well as the polytetrafluoroethylene plastics, are readily riveted to a metallic substrate by means of rivets fabricated from unplasticized vinyl plastics in the first instance and polytetrafluoroethylene in the second instance.

In order that those skilled in the art may better understand the methods of the present invention and in what manner the same may be carried into effect, the following specific examples are offered:

Example I

Portions of wet (16%–18% moisture), crude sodium bicarbonate crystals discharged from filter wheels in a commercial process for the separation of ammonia-soda crystals from ammoniated brine are moved over clean, smooth surfaces of the following:

Borosilicate glass (Pyrex)
Glazed porcelain

The wet ammonia-soda crystals adhere to and "hang up" on the surfaces of the material exposed to the wet crystals, even when said surfaces are inclined 90° from the horizontal. This tendency is greater than the tendency of the crystal aggregates to adhere to each other.

Example II

The same procedure as that described in Example I above is carried out using clean, smooth surfaces of the following:

Ordinary sheet steel
Polished steel
Stainless steel
Titanium metal
Aluminum
Copper The wet crystals adhere to these metallic surfaces to a slightly lesser degree than they adhere to the borosilicate glass and glazed porcelain. However, the adhesion of the crystals to these metallic surfaces is still greater than the adhesion of the crystals to each other. Also, the wet crystals adhere to the aluminum and copper surfaces (smooth but unpolished) to a slightly lesser degree than to the polished steel.

Example III

Portions of wet ammonia-soda crystals discharged from filter wheels used for the separation of crystals from ammoniated brine are moved over clean, smooth surfaces comprising the following:

Cyclized natural rubber resin (Pliolite)
Sulfur-cured natural gum rubber
Cured, pigmented, cotton fabric-reinforced, natural rubber belting
Hard natural rubber The tendency of the wet crystals to adhere to surfaces of each of the above substances is noted to be substantially the same as their tendency to adhere to the ordinary sheet steel. Also, the tendency for the crystals to "hang up" on surfaces of inclined planes coated with each of the above materials is found to be substantially the same as that encountered with inclined planes of sheet steel (smooth, clean surface) inclined at the same angle.

Example IV

A sheet of resinous copolymer of vinylidene chloride-vinyl chloride (Saran) is supported on a metallic substrate and portions of wet ammonia-soda crystals discharged from filter wheels used for the separation of crystals from ammoniated brine, are moved over the resinous copolymer sheet. Initially, there is very little tendency for the wet crystals to adhere to the copolymer sheeting as masses of the crystal are moved thereover. Gradually, the adhesion of the crystals to the sheeting increases to a slight extent, so that a thin layer of the wet crystals adheres to the sheeting after a relatively large mass of the crystals has moved thereover and the surface exposed to the crystals has become slightly roughened. The thin layer of the wet crystals, however, is readily removed from the sheet supported in a substantially vertical position by gently tapping the substrate.

Example V

Portions of wet ammonia-soda crystals discharged from the filter wheels used for the separation of crystals from ammoniated brine, are moved over clean surfaces presented by films of each of the materials listed below. The films are deposited upon both metallic and non-metallic rigid substrates from a solution of each of the substances listed, dissolved in a suitable solvent:

Polystyrene (from a benzene solution)
Polyvinyl butyral (from a benzene-acetone solution)
Cellulose acetate (from an acetone solution)
Cellulose acetate butyrate (from an acetone solution)
Cellulose acetate propionate (from an acetone solution)
Vinyl acetate (Bakelite, AYAF) (from an acetone solution)

In each case, the wet, crude sodium bicarbonate crystals exhibit very little, if any, tendency to adhere to the surfaces of the above substances to which they are exposed. After masses of crystals are moved over films formed by each of the above substances, either as a horizontal or inclined plane, substantially no adhesion of the crystals to the film with which they are in contact is found.

Example VI

Sheets of resinous polyethylene and plasticized resinous polyvinyl chloride (Koroseal), ¼ inch thick, are fastened to the inner walls of steel chutes, such as chute 16. With each of the so-treated chutes in a substantially vertical position over the valve mechanism, ammonia-soda crystals discharged from filter wheels for the separation of the crystals from ammoniated brine, are fed to the drier through the chutes. It is found that substantially none of the wet crystals adheres to either the polyvinyl chloride or the polyethylene-lined chutes, and that the capacity of the chutes to deliver the wet ammonia-soda crystals to the valving mechanism exceeds the capacity of the valving mechanism to deliver the crystals to the drier. The delivery of the wet crystal masses to the drier is maintained substantially continuous and constant at the capacity of the valve mechanism.

In contrast to the above, an unlined steel chute of substantially the same size and placed in substantially the same position and receiving ammonia-soda crystals from the same source as each of the above chutes and in the same amount, is found to be substantially solidly plugged with the crystals within 15–30 minutes, requiring considerable force to dislodge the plugged material. Further in contrast to the above, the unlined steel chute is found not to provide continuous constant feed to the bicarbonate drier to which it is connected. Still further in contrast to the above, the capacity of the bicarbonate drier to which the unlined steel chute is connected, is found to average over a substantial period with normal operation, i. e., when the steel chute is regularly attended to remove any plugging by the wet bicarbonate crystals, of the order of 90–100 tons per day, whereas the driers fed by the steel chutes lined with the resinous polyethylene and resinous plasticized polyvinyl chloride during the same period, unattended, are found to attain a capacity of 150–180 tons of soda ash per day without taking advantage of the full capacity of the lined steel chutes to deliver the wet ammonia-soda crystals.

Sheets of polymethylmethacrylate (Lucite) and polystyrene, ⅜ inch thick, and inclined at an angle from the horizontal, are employed as slides, such as slide 6, for the delivery of wet ammonia-soda crystals discharged from a filter wheel, such as wheel 2, and delivered onto a cured, pigmented, fabric-reinforced, endless, natural rubber belt. The crude, wet sodium bicarbonate crystals exhibit no tendency whatsoever to adhere to the methylmethacrylate sheeting or the polystyrene sheeting, i. e., no residual layer of crystals or isolated masses of crystals appear upon the surface of the methylmethacrylate or the polystyrene after the passage thereover of masses of the wet crystal agglomerates. However, the wet crystals tend to adhere tenaciously to the endless natural rubber belt in such a manner that appreciable amounts of the crystals adhere to the portion of the rubber belt returning to the filter wheels after passing its last delivery point, and such crystal masses must be removed by mechanical scrapers.

Example VII

A feeder valve mechanism for feeding a bicarbonate drier for the production of soda ash from ammonia-soda crystals, is coated with an emulsion of polytetrafluoroethylene (Teflon) and the mechanism placed in position at the feed end of a mixer for mixing the wet crystals with dry sodium carbonate. When wet ammonia-soda crystals are fed through the valving mechanism to the drier, there is no tendency for the wet crystals to adhere to the polytetrafluoroethylene-coated portions of the mechanism, and the capacity of the valve mechanism to feed the drier is increased to the extent of 1.5 to 2 times the capacity of an uncoated valve mechanism of the same type in the same valve.

*Example VIII*

The inside surfaces of 3 storage containers temporarily storing wet ammonia-soda crystals discharged from filter wheels are coated with bitumen ("mineral rubber"—air blown naphthenes from petroleum residues), resinous polyethylene, and plasticized polyvinyl chloride, respectively. Wet ammonia-soda crystals are placed in the containers. The wet crystals do not adhere to any of the linings of the containers, and all of the containers are readily emptied when inclined at an angle from the vertical.

*Example IX*

The inside surfaces of non-metallic storage containers of the type described in Example VIII are coated with liquid coating compositions to deposit a film containing chlorinated paraffin wax, the chlorine content of the chlorinated paraffin wax used being within the range of 65%–75% of chemically combined chlorine. The tendency of the wet ammonia-soda crystals to adhere to the surfaces presented by the coating compositions is found to be substantially zero, and the containers are emptied with the same ease as obtains with the bitumen lining. Moreover, the tendency of the wet crystals in the containers to form large lumps or aggregates is about the same as with the bitumen lining.

While no limitation is to be implied therefrom, it is believed that the phenomena described herein, whereby the problems of transportation of ammonia-soda crystals are solved, may be explained in view of the following considerations:

With respect to metals, ceramic materials, and the like, as to which the tendency to adhere to the ammonia-soda crystals is taught, these materials are known to have surface molecules oriented to present hydrophilic or highly polar groups to any material in contact with the surface. The water accompanying the ammonia-soda crystals wets such surfaces and the crystals, as the evidence demonstrates, adhere thereto.

In contrast to the materials of the class of metals, ceramics, and the like, the resinous organic substances taught herein as presenting suitable contact surfaces for transportation of ammonia-soda crystals, present at surfaces comprising membranes of such substances, predominantly hydrophobic or non-polar groups, the tendency of which is strongly to repel hydrophilic substances.

The theory advanced here is explanatory of the observed data. Moreover, in some instances, notably vinyl resins plasticized with materials characterized by strongly polar groups, it has been observed that initial poor operation and marked adherence of ammonia-soda crystals is commonly experienced, but that where a surface of such a material is employed for a sufficient period of time to permit of relatively substanital abrasion, the plasticized material then assumes the properties of the corresponding unplasticized vinyl resin and provides an excellent surface. It is apparent that the material, originally presenting a surface of hydrophilic character due to the orientation of the molecules of the plasticizer, is modified by the abrasive destruction of such orientation to present at the surface predominantly non-polar groups of the resin itself, whereby the hydrophobic property of such non-polar surface materials renders the materials suitable for use in the present invention.

A final notable observation, again tending to illustrate and support the theory of operation, is that very substantially hydrophobic materials, of which polyethylene is an excellent example, exhibit this hydrophobic character and ability to serve as a surface for transportation of ammonia-soda crystals in substantially frictionless relation, whether the surface is smooth or not. Thus, even a purposely roughened surface of polyethylene which has been abraded, as with sandpaper or the like, exhibits substantially the same efficiency as the normally physically smooth surface of polyethylene sheeting.

While there have been described various embodiments of the invention, the methods described are not intended to be understood as limiting the scope of the invention as it is realized that changes therewithin are possible and it is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. In the ammonia-soda process for the manufacture of sodium carbonate, the improvement which consists in removing crude sodium bicarbonate crystals from a slurry comprising the same and conveying said crystals on and in contact with surfaces consisting of hydrophobic resinous organic materials to a conversion zone where said crystals are converted to sodium carbonate, said organic materials consisting of molecules having predominantly non-polar groups and having skeletal carbon atoms attached to non-metal substituents.

2. In the ammonia-soda process for the manufacture of sodium carbonate, the improvement which consists in removing crude sodium bicarbonate crystals from a slurry comprising the same and conveying said crystals on and in contact with surfaces consisting of resinous organic materials to a conversion zone where said crystals are converted to sodium carbonate, said resinous organic materials being selected from the group consisting of: (A) polymers and copolymers of ethylenically unsaturated monomers having the generic formula $H_2C=CHR$, wherein R represents a member of the group of H, Cl, phenyl, $-OOCCH_3$, $-CH=CH_2$, and $-CN$; (B) polymers and copolymers of the compounds $H_2C=CCl_2$ and $C_2Cl_nF_{4-n}$, wherein $n$ is a whole number between 0 and 3, inclusive; (C) polymers and copolymers of ethylenically unsaturated monomers having the generic formula $H_2C=CR'COOR''$, wherein $R'$ represents one of H, $-CH_3$, and $-C_2H_5$, and $R''$ is an aliphatic hydrocarbon radical having from 1 to 12 carbon atoms; (D) alkylene diamine condensates with aliphatic dibasic acids; (E) substances chosen from the group consisting of cellulose esters of lower aliphatic acids, polymers of unsaturated high molecular weight fatty acids and fatty acid esters, chlorinated paraffin wax containing from 65% to 75% of chemically combined chlorine, and bitumen; (F) copolymers including at least 2 materials of (A), (B), and (C) above.

3. The method of claim 2 in which the resinous organic material is predominantly polyvinyl chloride.

4. The method of claim 2 in which the resinous organic material is predominantly polyvinylidene chloride.

5. The method of claim 2 in which the resinous organic material is polyethylene.

6. The method of claim 2 in which the resinous organic material is predominantly polymethylmethacrylate.

7. The method of claim 2 in which the resinous organic material is represented by the general formula $C_2Cl_nF_{4-n}$, wherein $n$ is a whole number between 0 and 3, inclusive.

References Cited in the file of this patent

UNITED STATES PATENTS

| Number | Name | Date |
|---|---|---|
| 1,312,430 | Benjamin | Aug. 5, 1919 |
| 1,752,210 | Smith | Mar. 25, 1930 |
| 1,854,252 | Freedlander | Apr. 19, 1932 |
| 1,906,434 | Taylor | May 2, 1933 |
| 2,172,341 | Berry | Sept. 12, 1939 |
| 2,293,413 | Stoner | Aug. 18, 1942 |
| 2,366,414 | Lindh | Jan. 2, 1945 |
| 2,408,245 | Walter | Sept. 24, 1946 |
| 2,586,587 | Wendt | Feb. 19, 1952 |

OTHER REFERENCES

Roger, Manual of Industrial Chemistry, D. Van Nostrand, New York, N. Y., 1942, vol. I, page 421.